April 12, 1927.

V. YNGVE

DRY BATTERY

Filed May 3, 1924

1,624,455

INVENTOR
Victor Yngve
BY
his ATTORNEY

Patented Apr. 12, 1927.

1,624,455

UNITED STATES PATENT OFFICE.

VICTOR YNGVE, OF SOUTH ORANGE, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY BATTERY.

Application filed May 3, 1924. Serial No. 710,789.

This invention relates to improvements in dry batteries, and particularly to dry batteries comprising a plurality of individual cells connected in series.

It is the object of this invention to provide a structure of this type which is simple to assemble and in which the individual cells are readily and reliably interconnected.

Figure 1:
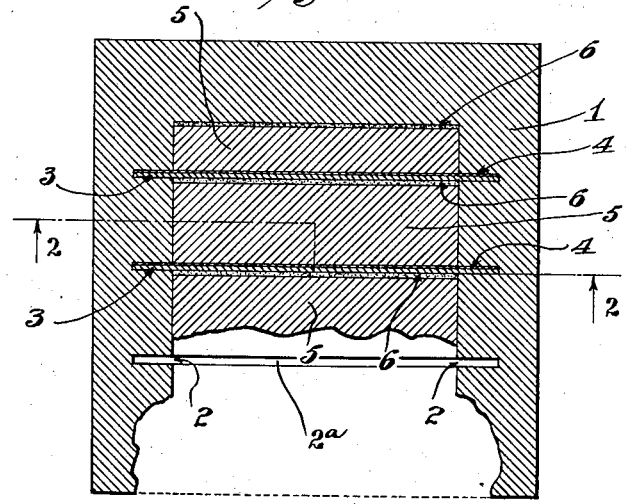
Figure 2:
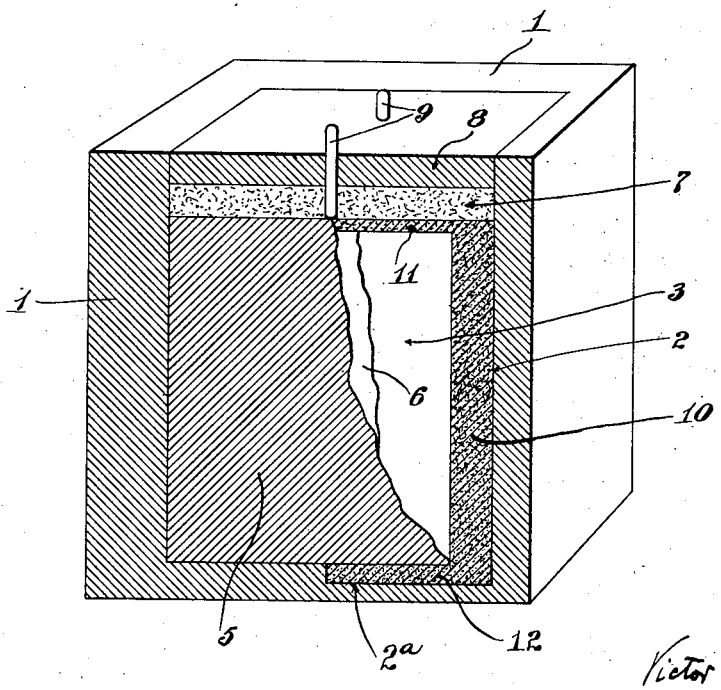

The invention is illustrated in the drawings as applied to a so-called "B" battery, Fig. 1 being a horizontal cross-section of a portion of such battery, and Fig. 2 a vertical cross-section along lines 2—2 of Fig. 1, with part of the battery shown in perspective.

1 is a box made of any suitable insulating material such as wood, fibre, cardboard, etc., which is open on one side. Two sides and the bottom of the box are provided with grooves or saw cuts 2 and 2ª. A plurality of zinc plates or discs 3 divide the box 1 into watertight compartments, each zinc plate being held along its edges in opposite grooves 2 and the bottom edge in a corresponding groove 2ª. One side of each zinc plate is covered with a sheet of paper 4, or other suitable cellulose material or the like, which is preferably coated on one or both sides with paste. The other side of each zinc disc 3 is coated with a conducting paint, e. g., graphite paint. The depolarizing mixture is provided in the form of tablets 5 that fit within the compartments of the box in such a manner that one side of each tablet contacts with the paper liner 4 and the other side, provided with a layer of graphite 6, contacts with the conducting paint on the adjacent zinc plate 3.

The paper liners 4 may be provided in the form usual in dry cell practice or as a molded or sprayed coating on the depolarizing tablets 5 or zinc discs 3. If the layers of graphite 6 are provided in the form of a coating on the tablets, then preferably each tablet is compacted in operation by feeding into the die of the press three successive layers of materials: paper pulp or the like, depolarizing mix, graphite or other carbonaceous material. When a sufficient quantity of each material has been supplied, then the tablet is compacted to the required size and density. The layers of graphite 6 may be provided also in the form of separate discs or in the form of a coating on the zinc discs 3. A thick coating of graphite paint on the zinc discs might avoid the necessity of providing separate layers 6.

In the battery thus assembled a plurality of cells will be formed, each cell composed of a carbon electrode 6, a layer of depolarizing material 5 and a zinc electrode 3, the two latter separated from each other by means of lining 4. The electrolyte may be contained in the lining 4 or depolarizing mixture 5, or both. Through the agency of the conducting paint entirely covering one of the exposed surfaces of the zinc discs 3, the zinc electrode 4 of each cell is connected with the carbon electrode 6 of the adjacent cell, and these two electrodes contact throughout their exposed surfaces. The swelling of the tablets and linings when the battery is moistened insures that the above mentioned contact be permanent and firm.

The whole assembly is sealed with successive layers of sand 7 and pitch 8, through which terminals 9 of the zinc discs 3 project, so as to allow connection with various cells of the assembly. In order further to reduce the danger of short circuits and to render the compartments watertight, the edges of the zinc discs are sealed into the slots 2 and 2ª, and the upper edge of each zinc is covered with pitch, paraffin or the like, as indicated at 10 and 11 and 12 in Fig. 2.

The provision of the depolarizing mass in the form of tablets 5 permits the ready assembly of the battery without danger of rupturing the casing, as would be the case with tamped batteries. The construction has, furthermore, the advantage that connection between adjacent cells is established as an incident of the assembling operation, and the provision of terminals 9 on the zinc electrodes alone dispenses with the necessity of providing separate terminals on the carbon electrodes, the two being conductively united.

What I claim is:

1. In a dry battery, a box of insulating material, a plurality of zinc plates held in said box and dividing it into watertight compartments, a coating of conducting paint on one side of each zinc plate, a paper lining covering the other side of each zinc plate, a tablet compacted of depolarizing material in each compartment, one side of each tablet contacting with the adjacent paper lining, and a compacted layer of carbonaceous material pressed by the other surface of each depolarizing tablet against the conducting paint on the zinc.

2. In a dry battery, a box of insulating material open on one side, a plurality of slots in opposite walls and the bottom of said box, a plurality of zinc plates held along the edges in slots and dividing said box into watertight compartments, a coating of conducting paint entirely covering an exposed side of each zinc plate, a paper lining entirely covering the other exposed side of each zinc plate, a tablet compacted of depolarizing material in each compartment, one side of each tablet contacting throughout its surface with the adjacent paper lining, a compacted layer of graphite covering the other surface of each depolarizing tablet and contacting throughout its surface with the conducting paint on the adjacent zinc plate, an insulating layer entirely covering the open side of the box, an insulating coating filling in said slots and covering the upper edge of each zinc plate, and terminals for said zincs projecting through said insulating layer.

3. In a dry battery, a box of insulating material, a plurality of zinc plates held in said box and dividing it into watertight compartments, a paste coated paper lining covering one side of each zinc plate and a carbon electrode and depolarizing material in each compartment.

In testimony whereof, I have signed my name to this specification, this 2nd day of May, 1924.

VICTOR YNGVE.